United States Patent
Craven et al.

(10) Patent No.: US 12,177,035 B2
(45) Date of Patent: Dec. 24, 2024

(54) SYSTEM AND METHOD FOR THE IMPROVED PROVISION OF USER BANDS VIA ONE OR MORE SINGLE-CABLE INTERFACES

(71) Applicant: ARRIS ENTERPRISES LLC, Suwanee, GA (US)

(72) Inventors: Christopher John Craven, Leeds (GB); Robert Michael Payne, Keighley (GB); Paul Richard Pratt, Wakefield (GB); Lars Andreas Wallstrom, Linkoping (SE)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 18/272,854

(22) PCT Filed: Feb. 17, 2022

(86) PCT No.: PCT/US2022/016739
§ 371 (c)(1),
(2) Date: Jul. 18, 2023

(87) PCT Pub. No.: WO2022/159914
PCT Pub. Date: Jul. 28, 2022

(65) Prior Publication Data
US 2024/0305497 A1 Sep. 12, 2024

Related U.S. Application Data

(60) Provisional application No. 63/140,360, filed on Jan. 22, 2021.

(51) Int. Cl.
*H04L 12/28* (2006.01)
*H04H 40/90* (2008.01)
*H04N 7/20* (2006.01)

(52) U.S. Cl.
CPC ......... *H04L 12/2838* (2013.01); *H04H 40/90* (2013.01); *H04N 7/20* (2013.01)

(58) Field of Classification Search
CPC ....... H04L 12/2838; H04H 40/90; H04N 7/20
See application file for complete search history.

(56) References Cited

U.S. PATENT DOCUMENTS

| | | | |
|---|---|---|---|
| 6,600,730 B1 * | 7/2003 | Davis | H04B 7/18517 455/12.1 |
| 10,321,201 B2 * | 6/2019 | Popa | H04N 21/6193 |

(Continued)

FOREIGN PATENT DOCUMENTS

WO 2015150422 A1 10/2015

OTHER PUBLICATIONS

International Search Report and Written Opinion, dated May 11, 2022, issued in corresponding International Application No. PCT/US2022/16739, 9 pgs.

*Primary Examiner* — Oschta I Montoya
(74) *Attorney, Agent, or Firm* — Panitch Schwarze Belisario & Nadel LLP

(57) ABSTRACT

A system and method enabling the concurrent provision of multiple multi-user band transmissions, each via a single cable, to a media gateway appliance, thereby providing the media gateway appliance with an increased array of user bands for the provision of program content. The multiple multi-user band transmissions can originate from a single multi-output single-cable interface, or from multiple single-output single-cable interface. This enables the switching fabric and internal tuners of a given media gateway appliance to select any one of the provided user bands and demodulate program content therefrom.

12 Claims, 5 Drawing Sheets

(56) References Cited

U.S. PATENT DOCUMENTS

| | | | |
|---|---|---|---|
| 2002/0178454 A1* | 11/2002 | Antoine | H04N 21/4788 |
| | | | 725/63 |
| 2006/0225103 A1* | 10/2006 | James | H04N 7/20 |
| | | | 725/68 |
| 2012/0264365 A1* | 10/2012 | Wong | H04N 21/426 |
| | | | 455/3.02 |
| 2014/0123194 A1 | 5/2014 | Wong et al. | |
| 2021/0013980 A1* | 1/2021 | Nagarathinam | H04H 40/90 |
| 2021/0258070 A1* | 8/2021 | Yilmazlar | H04B 7/18543 |

* cited by examiner

SYSTEM AND METHOD FOR THE IMPROVED PROVISION OF USER BANDS VIA ONE OR MORE SINGLE-CABLE INTERFACES

BACKGROUND OF THE INVENTION

Satellite provision of broadband media remains a popular option for consumers, especially those who find themselves in markets that are underserved by terrestrial broadband providers. A widely accepted standard for the configuration and implementation of satellite reception and distribution systems is EN 50494, "Satellite signal distribution over a single coaxial cable in single dwelling installations", which was approved by the European Committee for Electrotechnical Standardization in 2007. A block diagram of a typical single dwelling consumer systems, in conformance with EN 50494 are shown in shown in FIGS. 1A and 1B.

The system of FIG. 1A consists of external dish antenna 102, low-noise block downconverter ("LNB") 104, single cable interface ("SCIF") 106 and media gateway appliance ("MGA") 108. External dish antenna 102 collects high-frequency satellite transmissions, which are then down-converted to intermediate frequencies and split into four separate input banks (110). Each of these banks is then mapped onto a particular user band ("UB") by SCIF 106 and provided, via single cable 112, to MGA 108. MGA 108 can be a customer premises device, such as a set-top box or a digital television, housing multiple, independent tuners, each of which is capable of tuning to particular programming content within one of the UBs. In the system of FIG. 1A, SCIF 106 can support up to four tuners within MGA 108, as each independent tuner would require one UB.

However, if MGA 108 had more than four tuners, or if, as is shown on FIG. 1B, the output of SCIF 106 was split (114) so as to feed multiple MGAs (116 and 118), each of which had four tuners, then SCIF 106 would prove inadequate for concurrently providing viable UBs to all available tuners within the system.

There exists a need for a system and method for concurrently providing a greater number of UBs to a given MGA or multiple MGAs, and thereby enable the independent and concurrent tuning of an increased number of program offerings from one or more down-converted satellite feeds. Ideally, such a system would enable users to select from multiple UBs provided by multiple SCIF outputs.

BRIEF SUMMARY OF THE INVENTION

A system and method enabling the concurrent provision of multiple multi-UB transmissions, each via a single cable, to an MGA, thereby providing the MGA with an increased array of UBs for the provision of program content. The multiple multi-UB transmissions can originate from a single multi-output SCIF, or from multiple single-output SCIFs. This enables the switching fabric and internal tuners of a given MGA to select any one of the provided UBs and demodulate program content therefrom.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1A:
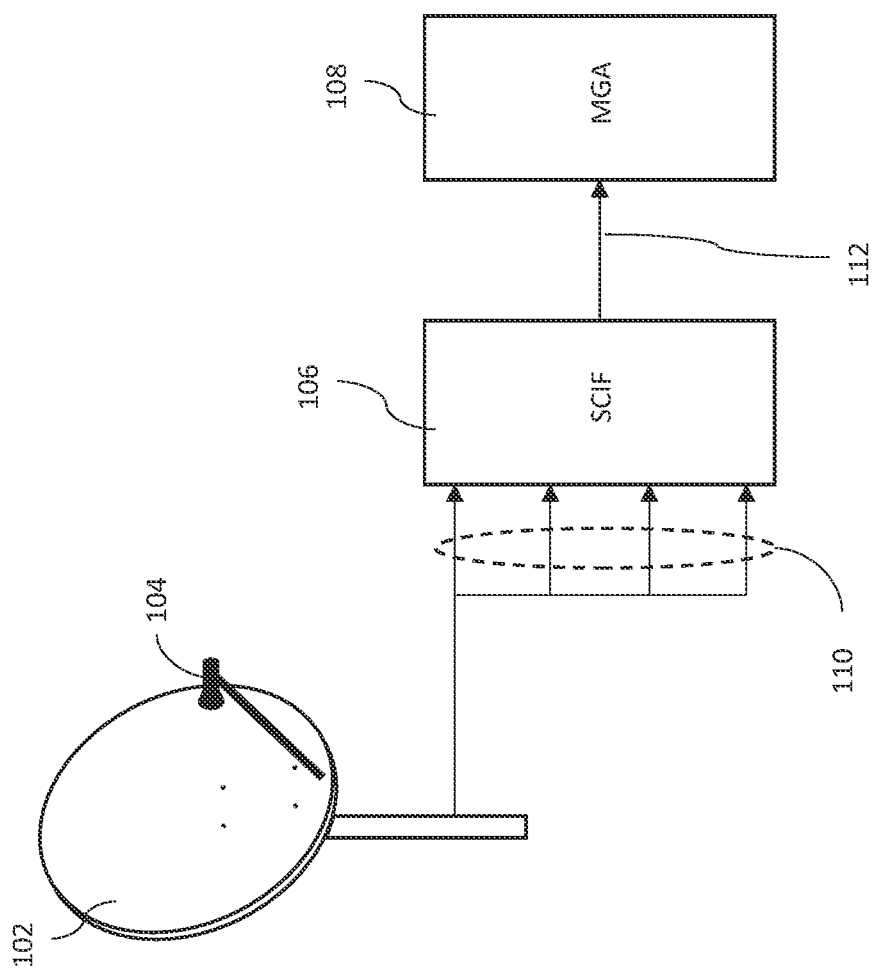
FIG. 1A is a functional block diagram of a first prior art consumer satellite system.
Figure 1B:
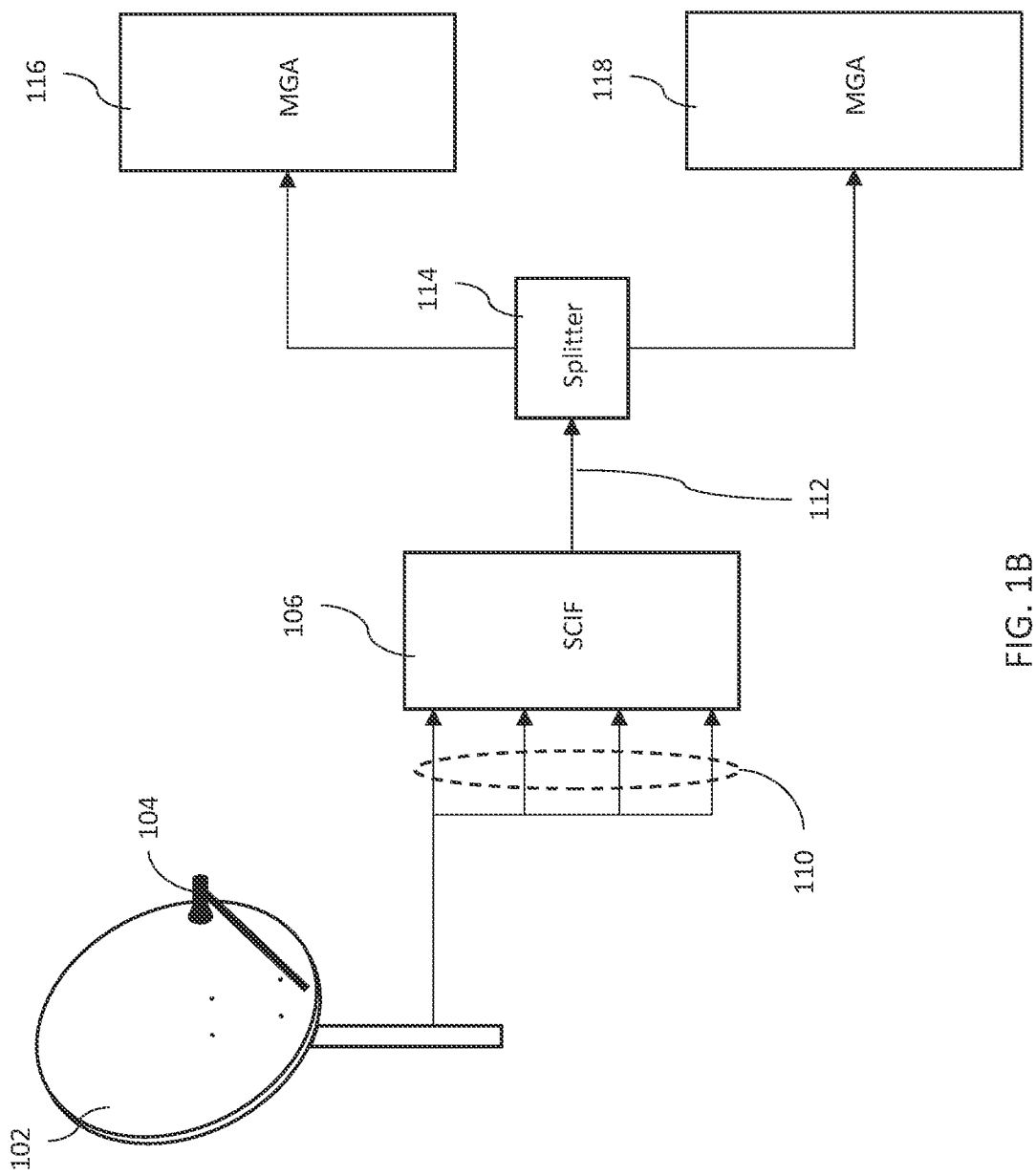
FIG. 1B is a functional block diagram of a second prior art consumer satellite system.
Figure 2:
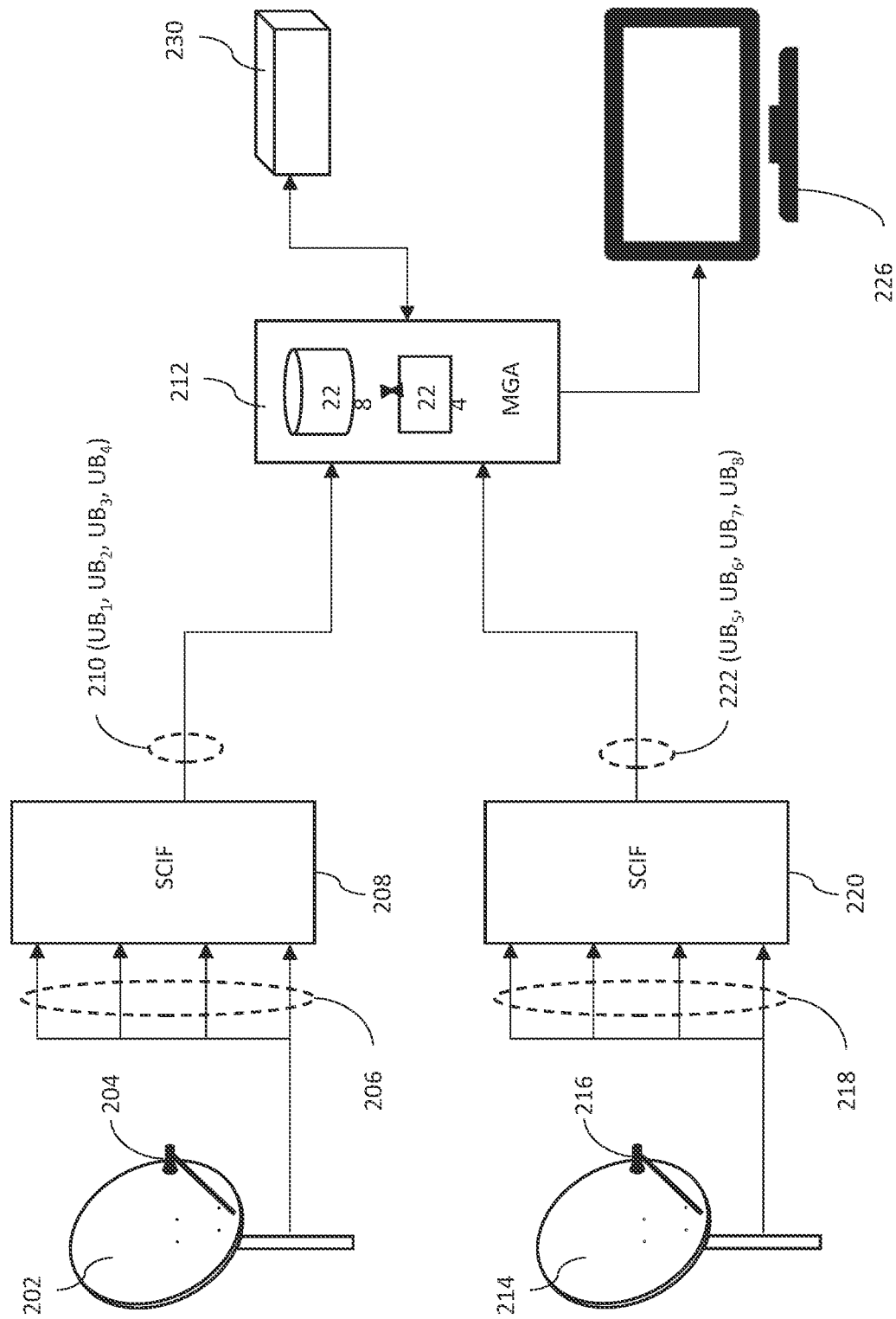
FIG. 2 is a functional block diagram of an embodiment of an improved consumer satellite system supporting the concurrent provision of UBs from two SCIFs to an MGA.

FIG. 2 provides a functional block diagram of a first embodiment of an improved consumer satellite system supporting the concurrent provision of UBs from multiple SCIFs to an MGA. As shown, dish antenna 202 collects high-frequency satellite transmissions, which are then down-converted by LNB 204 to intermediate frequencies and split into four separate input banks (206). The banks are then mapped onto four particular user bands ($UB_1$, $UB_2$, $UB_3$, $UB_4$) by SCIF 208 and provided, via single cable 210, to MGA 212. Similarly, dish antenna 214 collects high-frequency satellite transmissions, which are then down-converted by LNB 216 to intermediate frequencies and split into four separate input banks (218). The banks are then mapped onto four particular UBs ($UB_5$, $UB_6$, $UB_7$, $UB_8$) by SCIF 220 and provided, via single cable 222, to MGA 212. This effectively enables eight independent UBs to be made concurrently available to MGA 212. The switching fabric and internal tuners of MGA 212 can then, in response to a command from controller 224, select any one of the eight UBs and demodulate program content therefrom for "live" viewing upon a monitor or television (226), or for storage within an internal or external memory (228 and 230 respectively). The switching, selective tuning and demodulation of UBs is well-known in the art and will not be discussed in detail here.

The command from controller 224 could be executed in response to a user command originating from a remote control or other user interface linked to the MGA. It could also be executed in response to an instruction stored within memory 2286 of MGA 212. Such stored instructions would typically be associated with digital video recording ("DVR") functionality within an MGA.

Figure 3:
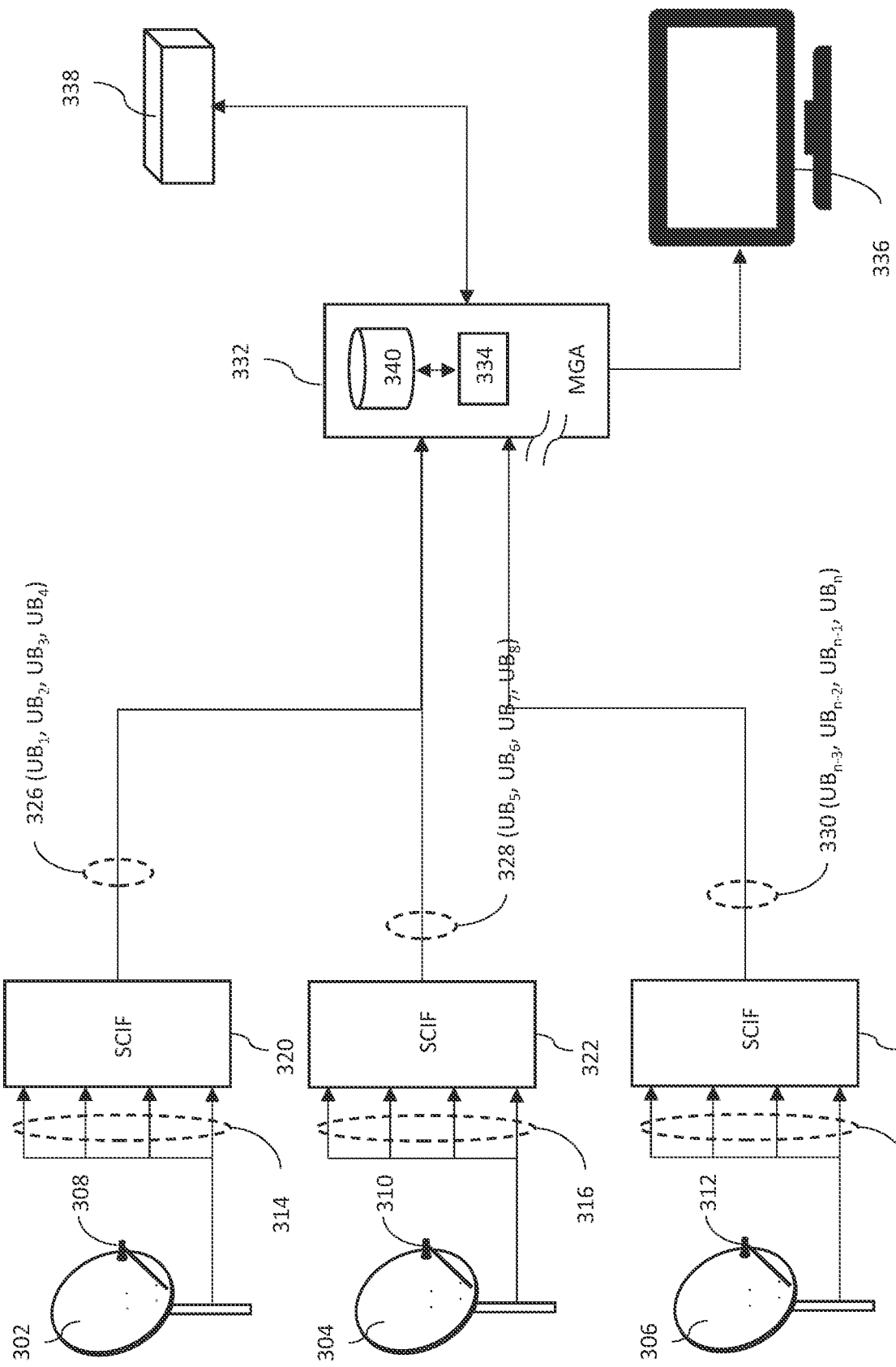
FIG. 3 is a functional block diagram of an embodiment of an improved consumer satellite system supporting the concurrent provision of UBs from multiple SCIFs to an MGA.

The architecture of the system shown in FIG. 2 could be expanded to accommodate any number of individual SCIFs, each fed by at least one LNB. Such an arrangement is shown in FIG. 3. Dishes 302, 304 and 306 provide high-frequency satellite transmissions to LNBs 308, 310 and 312, respectively. Each LNB down-converts the transmissions to intermediate frequencies and splits them into a group of four separate input banks (314, 316 and 318) and provides them to the inputs of each SCIF (320, 322, 324). Each SCIF maps the received banks onto a group of four UBs ($UB1$-$UB_n$) and routs the UBs via a single cable (326, 328 and 330) to MGA 332. Consequently, n independent UBs are made concurrently available to MGA 332. The switching fabric and internal tuners of MGA 332, in response to commands from controller 334, would then be capable of selecting any one of the n UBs and demodulate program content therefrom for "live" viewing upon a monitor or television (334), or for storage within an internal or external memory (338 and 340) respectively).

Figure 4:
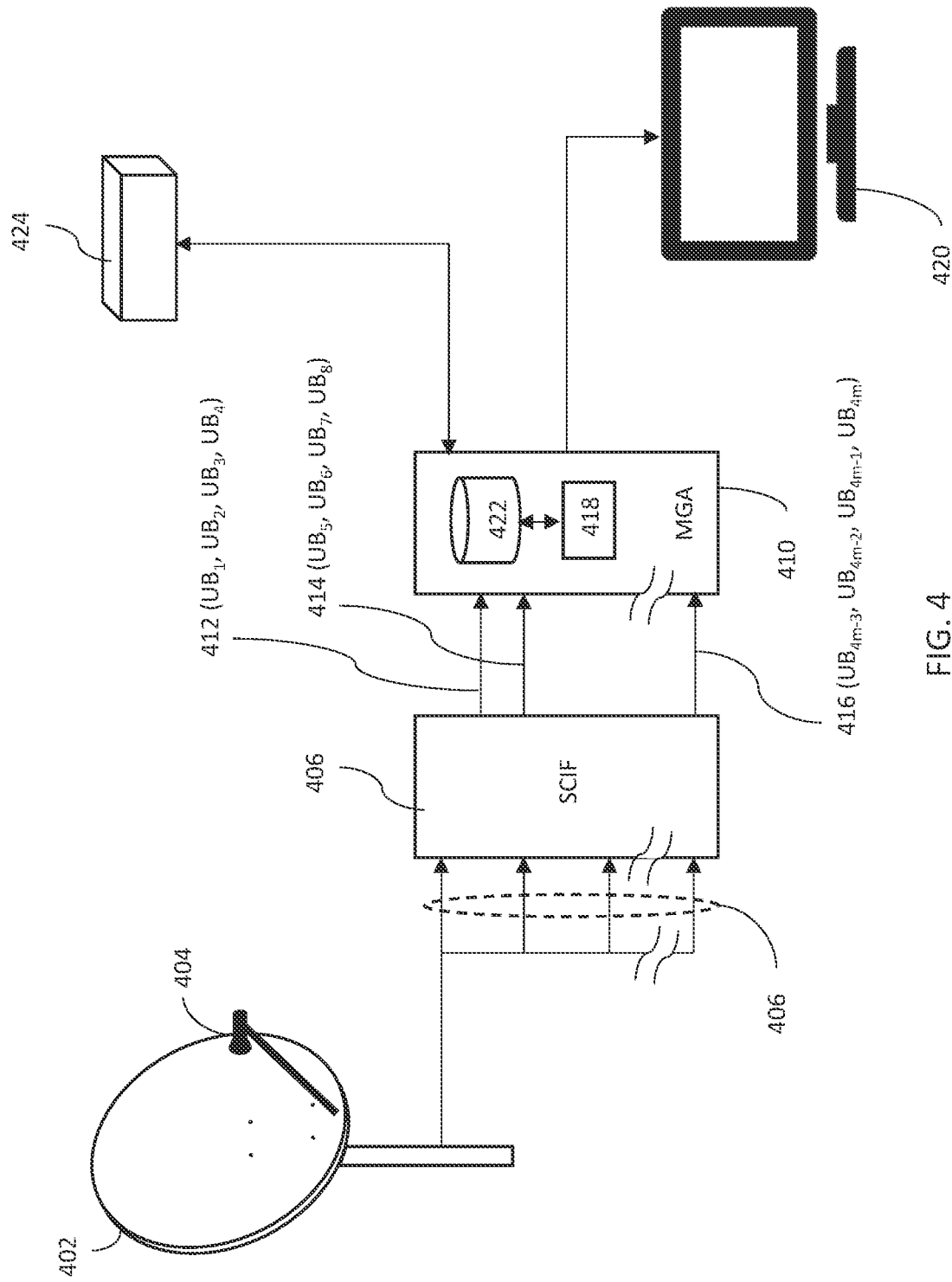
FIG. 4 is a functional block diagram of an embodiment of an improved consumer satellite system supporting the concurrent provision of UBs from multiple-output SCIF to an MGA.

An additional embodiment is depicted in FIG. 4. Dish antenna 402 collects high-frequency satellite transmissions, which are then down-converted by LNB 404 to intermediate frequencies and split into n separate input banks (406). The banks are then mapped onto m groups of four UBs ($UB_1$-$UB_{4m}$) by SCIF 408. Each group of four UBs is then provided to an input of MGA 410 via a single cable (412, 414, . . . 416). Thus, MGA 410 is concurrently presented with 4m UBs, each of which can be selected and tuned in response to commands from controller 418, so as to access and route program content. This program content can be routed to monitor 420 for viewing, or stored within internal memory 422 and/or external memory 424.

Although the invention herein has been described with reference to particular embodiments, it is to be understood that these embodiments are merely illustrative of the principles and applications of the present invention. Other embodiments and variations could be implemented without departing from the spirit and scope of the present invention as defined by the appended claims. Furthermore, the invention could be implemented in a single unitary device, or across multiple devices that are linked directly or via one or more network connections.

The invention claimed is:

1. A system for the provision of multiple multi-user band transmissions to a media gateway appliance, comprising:
a plurality of single-cable interface devices, each of which is adapted to:
receive at least one intermediate-frequency signal;
separate the received intermediate-frequency signal into n input banks, where n is greater than 1;
map each of the n input banks on to an individual one of n user bands; and
output the n user bands via a single output cable; and
at least one media gateway appliance adapted to concurrently receive the single cable outputs from each of the plurality of single-cable interface devices, the at least one media gateway appliance comprising:
at least one output;
a plurality of tuners;
a switching fabric adapted to selectively link any single one of the received single cable outputs with at least one of the plurality of tuners; and
at least one controller; adapted to:
instruct the switching fabric to link at least a one particular received single cable output with at least one particular tuner;
instruct the at least one particular tuner to tune to a particular one of the n user bands evident upon a received single cable output and extract program content therefrom; and
route the extracted program content to the at least one output.

2. The system of claim 1 wherein the at least one output comprises at least one of the following:
a conduit linked to a monitor;
a conduit linked to a television;
a conduit linked to a memory external to the media gateway apparatus; and
a conduit linked to a memory internal to the media gateway apparatus.

3. The system of claim 1 wherein the media gateway appliance comprises at least one of the following:
a set-top box; and
a digital television.

4. The system of claim 1 wherein the plurality of tuners comprises at least n tuners, and wherein the at least one controller is further adapted to provide instructions to the switching fabric and the n tuners to support the concurrent independent extraction of program content by each of the n tuners.

5. The system of claim 1 where n is equal to four.

6. The system of claim 1 wherein the at least one intermediate-frequency signal is received from a low-noise block downconverter associated with a terrestrial satellite signal receiver.

7. A method for the provision of multiple multi-user band transmissions to a media gateway appliance, in a system comprising:
a plurality of single-cable interface devices, each of which is adapted to:
receive at least one intermediate-frequency signal;
separate the received intermediate-frequency signal into n input banks, where n is greater than 1;
map each of the n input banks on to an individual one of n user bands; and
output the n user bands via a single output cable; and
at least one media gateway appliance adapted to concurrently receive the single cable outputs from each of the plurality of single-cable interface devices, the at least one media gateway appliance comprising:
at least one output; and
a plurality of tuners:
the method comprising the steps of:
linking at least a one particular received single cable output with at least one particular tuner;
tuning at least one particular tuner to a particular one of the n user bands evident upon a received single cable output;
extracting program content from the particular one of the n user bands; and
routing the extracted program content to the at least one output.

8. The method of claim 7 wherein the at least one output comprises at least one of the following:
a conduit linked to a monitor;
a conduit linked to a television;
a conduit linked to a memory external to the media gateway apparatus; and
a conduit linked to a memory internal to the media gateway apparatus.

9. The method of claim 7 wherein the media gateway appliance comprises at least one of the following:
a set-top box; and
a digital television.

10. The method of claim 7 wherein the plurality of tuners comprises at least n tuners, and wherein the steps of linking, tuning, and extracting support the concurrent independent extraction of program content by each of the n tuners.

11. The method of claim 7 where n is equal to four.

12. The method of claim 7 wherein the at least one intermediate-frequency signal is received from a low-noise block downconverter associated with a terrestrial satellite signal receiver.

* * * * *